US008878529B2

(12) United States Patent
Baecher et al.

(10) Patent No.: US 8,878,529 B2
(45) Date of Patent: Nov. 4, 2014

(54) SENSOR MODULE AND METHOD FOR MONITORING THE FUNCTION THEREOF

(75) Inventors: Dieter Baecher, Sexau (DE); David Muthers, Freiburg (DE); Joerg Franke, Freiburg (DE)

(73) Assignee: Micronas GmbH, Freiburg I.Br. (DE)

( * ) Notice: Subject to any disclaimer, the term of this patent is extended or adjusted under 35 U.S.C. 154(b) by 405 days.

(21) Appl. No.: 13/070,090

(22) Filed: Mar. 23, 2011

(65) Prior Publication Data

US 2011/0234813 A1   Sep. 29, 2011

(30) Foreign Application Priority Data

Mar. 23, 2010   (EP) .................................... 10003045

(51) Int. Cl.
*G01R 33/06* (2006.01)
*G01D 3/08* (2006.01)

(52) U.S. Cl.
CPC ...................................... *G01D 3/08* (2013.01)
USPC .................. 324/251; 324/117 R; 324/117 H; 324/127; 324/128; 324/252; 324/537; 324/762.01; 324/160; 324/180; 324/207.12; 324/207.21; 702/64; 702/76; 702/108; 702/127; 702/189; 702/190; 702/191; 702/194; 702/195

(58) Field of Classification Search
USPC .......... 324/117 R, 117 H, 127, 128, 160–180, 324/207.12–207.21, 251, 252, 537, 762.01; 702/64, 76, 108, 127, 189, 190, 191, 702/194, 195
See application file for complete search history.

(56) References Cited

U.S. PATENT DOCUMENTS

| 4,812,757 | A  | * | 3/1989 | Meins et al. .............. 324/207.12 |
| 6,243,430 | B1 | * | 6/2001 | Mathe .......................... 375/346 |

(Continued)

FOREIGN PATENT DOCUMENTS

| DE | 101 42 169 A1 |   | 3/2003 |
| DE | 10142169 A1   | * | 3/2003 |
| EP | 0 962 748 B1  |   | 8/2001 |
| EP |   962748 B1   | * | 8/2001 |

OTHER PUBLICATIONS

Baltes, H. and Popovic, R.; Integrated Semiconductor Magnetic Field Sensors; Aug. 1986; Proceedings of the IEEE; vol. 74, Issue: 8; pp. 1107-1132.*

(Continued)

*Primary Examiner* — Patrick Assouad
*Assistant Examiner* — Sean Curtis
(74) *Attorney, Agent, or Firm* — Muncy, Geissler, Olds & Lowe, P.C.

(57) ABSTRACT

A method for monitoring the function of a sensor module including sensor which generates a measurement signal for a physical quantity to be determined and applies the measurement signal to an output terminal in an unchanged form or in processed form. In addition, a test signal is generated whose spectrum lies outside the spectrum of the measurement signal. The test signal is supplied at a place in the sensor from which it reaches the output terminal in unchanged form or in processed form only in the case of a functional sensor. An output signal present at the output terminal is compared with the test signal and a diagnosis signal is generated, which indicates whether the test signal is present at the output terminal. The test signal is filtered out of the output signal and the remaining signal is applied as the measurement signal at an output of the sensor module.

19 Claims, 4 Drawing Sheets

(56) References Cited

U.S. PATENT DOCUMENTS

| | | | |
|---|---|---|---|
| 6,313,642 B1* | 11/2001 | Brooks | 324/547 |
| 6,424,143 B1* | 7/2002 | Blossfeld et al. | 324/160 |
| 6,759,844 B2* | 7/2004 | Kliemannel | 324/251 |
| 7,756,680 B2* | 7/2010 | Hammerschmidt | 702/185 |
| 8,258,795 B2* | 9/2012 | Fink et al. | 324/537 |
| 2004/0194532 A1* | 10/2004 | Lally et al. | 73/1.82 |
| 2007/0150136 A1* | 6/2007 | Doll et al. | 701/34 |

OTHER PUBLICATIONS

Baltes, H. and Popovic, R.; Integrated Semiconductor Magnetic Field Sensors; Aug. 1986; Proceedings of the IEEE; vol. 74, Issue: 8, pp. 1107-1132.*

* cited by examiner

SENSOR MODULE AND METHOD FOR MONITORING THE FUNCTION THEREOF

This nonprovisional application claims priority under 35 U.S.C. §119(a) to European Patent Application No. EP 10003045.1, which was filed on Mar. 23, 2010, and which is herein incorporated by reference.

BACKGROUND OF THE INVENTION

1. Field of the Invention

The invention relates to a sensor module, which has a sensor with a sensor output for outputting a measurement signal for a physical quantity, whereby the sensor output is connected to an output terminal directly or via at least one signal processing stage provided for processing the measurement signal. In addition, the invention relates to a method for monitoring the function of a sensor module, which has a sensor by means of which a measurement signal for a physical quantity to be determined is generated and applied to an output terminal in an unchanged form or in processed form— after at least one linear signal processing step and/or at least one nonlinear signal processing step are performed.

2. Description of the Background Art

A sensor module is disclosed in European Pat. No. EP 0 962 748 B1, which corresponds to U.S. Pat. No. 6,424,143, and which is incorporated herein by reference. The sensor module is formed as a monolithic integrated circuit, which has a magnetic field sensor for detecting a magnetic field generated by an external transducer, a measuring amplifier, and an evaluation circuit, which is connected to internal measurement points of the integrated circuit. The evaluation circuit has a modulator for modulating the output measurement signal. In order to output the information available in the internal evaluation circuit, the internally determined measurement values are passed as modulation signals to the modulator, which superimposes these on the digital output measurement signal. With the aid of information passed on to the outside in this manner, it is possible to reach conclusions on the instantaneous operating point of the circuit and to detect changes that move in the direction of the operating limits of the sensor module, in a timely fashion before complete failure of the sensor occurs. Although the sensor module has proven its value in practice, it nevertheless has disadvantages. Thus, the information passed to the outside enable only a limited check of sensor module functionality.

SUMMARY OF THE INVENTION

It is therefore an object of the present invention to provide a method and a sensor module that enable in a simple manner a reliable check of sensor module functionality during operation.

This object is achieved in an embodiment in that a test signal is generated whose spectrum lies substantially outside the spectrum of the measurement signal, the test signal is supplied at a place in the sensor from which it reaches the output terminal in unchanged form or in processed form— after the performance of the at least one linear signal processing step—only in the case of a functional sensor and is additively superimposed in an output signal applied here on the unchanged or processed measurement signal, the output signal is compared with the test signal and a diagnosis signal is generated, which indicates whether the test signal is contained in the output signal, and the test signal is filtered out of the output signal and the remaining signal is applied as the measurement signal at a measurement signal output of the sensor module.

In the method of the invention, therefore, a predefined test signal with defined properties is applied to the sensor so that it reaches the output terminal only in the case of a functional sensor. It is checked whether the test signal is passed on further to the output of the sensor and the sensor is thereby functional. As a result, the sensor's entire signal path can be checked in a simple manner. Because the test signal is filtered out of the output signal, the functional check can be carried out during the measurement of the physical quantity. The test signal can also be applied to the sensor in the form of the physical quantity to be measured. Thus, for example, in a sensor module with a magnetic field sensor, an alternating magnetic field is superimposed as a test signal by means of a coil integrated into the sensor module on the magnetic field to be measured to check sensor module function.

In an embodiment of the invention, the measurement signal and the test signal are analog signals, which can be converted preferably by sigma-delta modulation into a digital output signal, whereby a digital test signal corresponding to the analog test signal is provided and correlated with the digital output signal, and whereby the diagnosis signal is generated depending on the correlation result. In this regard, the diagnosis signal can be generated by comparing a correlation signal, generated by correlation of the test signal with the digital output signal, with a constant threshold value. The method can then be implemented in a simple manner in a sensor module, which has a digital signal processing unit.

In an embodiment of the invention, the test signal is removed by decimation filtering from the output signal, whereby the transfer function of the decimation filtering has zero positions, and whereby the spectrum of the analog test signal has local maxima, which coincide with the zeros. A decimation filter present in the sensor module can then be used for filtering the test signal out of the output signal. Thus, an additional digital filter is eliminated.

The analog test signal is preferably a square wave signal. The spectrum of the test signal then has needle-shaped pulses which are arranged at constant distances to one another and can be arranged so that they can coincide with the zero positions of the transfer function of the decimation filter.

In an embodiment of the invention, the test signal is supplied to the sensor at a place from which it reaches a sensor output only in the case of a functional sensor and is superimposed additively in a sensor signal applied here on the measurement signal, whereby the test signal is removed from the thus obtained sensor signal and at least one nonlinear signal processing step is performed with the remaining signal, to provide the measurement signal in the processed form, whereby the test signal is superimposed additively on the thus obtained, processed measurement signal and the superposition signal formed in this manner is applied at the output terminal. The nonlinear signal processing step is therefore not used for the test signal, so that it can be removed from the output signal in a simple manner. As a result, despite the nonlinear signal processing step it is possible to monitor the function of essential components of the sensor module.

If needed, the at least one nonlinear signal processing step can comprise a trigonometric operation, particularly an arc tangent operation.

At the measurement signal output, an angle signal can then be output, which indicates the angle between the magnetic field and a measurement or reference axis of the sensor.

The sensor preferably has a sensor region which is sensitive for the physical quantity and where as a measurement signal an electrical voltage dependent on the physical quantity is applied, whereby the test signal is an electric current, which is supplied to the sensor in such a way that it causes a voltage drop in the sensor region. As a result, the test signal can be injected into the sensor in a simple manner so that it runs through the entire signal path from the sensor region to the output terminal.

The physical quantity can be a magnetic field. The method of the invention, however, can also be used in the measurement of other physical quantities, particularly in the measurement of a gas concentration, a pressure, an angle of rotation, and/or a position.

In regard to the sensor module of the aforementioned type, the aforementioned object is achieved in that the sensor module has a test signal generator for generating a test signal whose spectrum is substantially outside the spectrum of the measurement signal, the test signal generator is coupled to the sensor in such a way that the test signal reaches the output terminal only in the case of a functional sensor and is superimposed additively there on the measurement signal or the processed measurement signal, a diagnosis unit is connected to the output terminal, the unit which has a component for generating a diagnosis signal, which indicates whether the test signal is present at the output terminal, and the output terminal is connected via a test signal-blocking filter to a measurement signal output of the sensor module.

The sensor module can be formed as a monolithic integrated circuit, which has a first external terminal connected to the measurement signal output and a second external terminal for outputting the diagnosis signal. The functionality or nonfunctionality of the sensor and optionally other components contained in the sensor module can be checked in a simple manner from outside with the use of the diagnosis signal. The diagnosis signal is preferably a digital signal. The diagnosis signal can also be transmitted outward via a current supply terminal of the sensor module in that it is modulated to the supply current and/or the supply voltage. As a result, the external terminal can be omitted.

In an embodiment of the invention, the sensor can have an analog output for the measurement signal and the test signal generator is formed to generate an analog test signal, whereby the analog output is connected to the output terminal via an analog-to-digital converter, particularly a sigma-delta converter, whereby the diagnosis unit has a digital test signal generator for generating a digital test signal corresponding to the analog test signal and a correlation unit, which is connected with a first correlation input to a converter output of the analog-to-digital converter and with a second correlation input to the digital test signal generator. In this regard, a digital signal processing unit with a microprocessor, in which the operations necessary for the diagnosis unit can run in the form of an operating program, may be integrated into the sensor.

The diagnosis unit can have a comparator, which to generate a diagnosis signal is connected with a first comparator input to an output of the correlation unit and with a second comparator input to a reference value source for a constant reference signal.

In an embodiment of the invention, the filter is formed as a decimation filter whose transfer function has zero positions, whereby the spectrum of the analog test signal has local maxima, which coincide with the zeros. The decimation filter then fulfills a double function, in which it is used apart from a decimation filter also for filtering the test signal out of the digital output signal of the analog-to-digital converter.

In an embodiment of the invention, the sensor output is connected directly or via a linear signal processing stage to a first input of a subtraction element, whereby a second input of the subtraction element is connected to a terminal for the test signal, whereby an output of the subtraction element is connected via a nonlinear signal processing stage to a first input of an addition element, whereby a second input of the addition element is connected to the terminal for the test signal, and whereby the output of the addition element forms the output terminal or is connected thereto via an additional signal processing stage. The test signal is therefore not passed through the nonlinear signal processing stage and it is added only after the nonlinear signal processing stage to the output signal thereof. As a result, despite the nonlinear signal processing step, it is possible to monitor the function of essential components of the sensor module.

The nonlinear signal processing stage can be formed to carry out a trigonometric operation, particularly to carry out an arc tangent operation. At the measurement signal output, an angle signal can then be output, which indicates the angle between the magnetic field and a measurement or reference axis of the sensor.

If the test signal generator is a square wave signal generator, the maxima of the spectrum of the test signal coincide especially well with the zeros of the transfer function of the decimation filter.

In an embodiment of the invention, the test signal generator can be formed as a current source, whereby the sensor has a sensor region sensitive for the physical quantity, whereby said sensor region has an electrical resistance, and whereby the sensor region is connected to the test signal generator in an electric circuit. The test signal can then be supplied to the sensor in a simple manner so that it reaches the output terminal only in the case of a functional sensor.

It is advantageous when the sensor is a magnetic field sensor and has a Hall plate, which has at least one first terminal contact, a second terminal contact, a third terminal contact, and a fourth terminal contact, which are spaced apart from one another, when the first terminal contact and the third terminal contact are connected to a measuring current source to supply a measuring current to the Hall plate, and when the second terminal contact and the fourth terminal contact to tap off a Hall voltage, oriented transverse to the measuring current, are connected to a voltmeter and to apply the test signal are connected to the test signal terminals of the analog test signal generator. The test signal then overlaps in the form of an electrical voltage of the Hall voltage present between the second and fourth terminal contact in the presence of the magnetic flux passing through the Hall plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
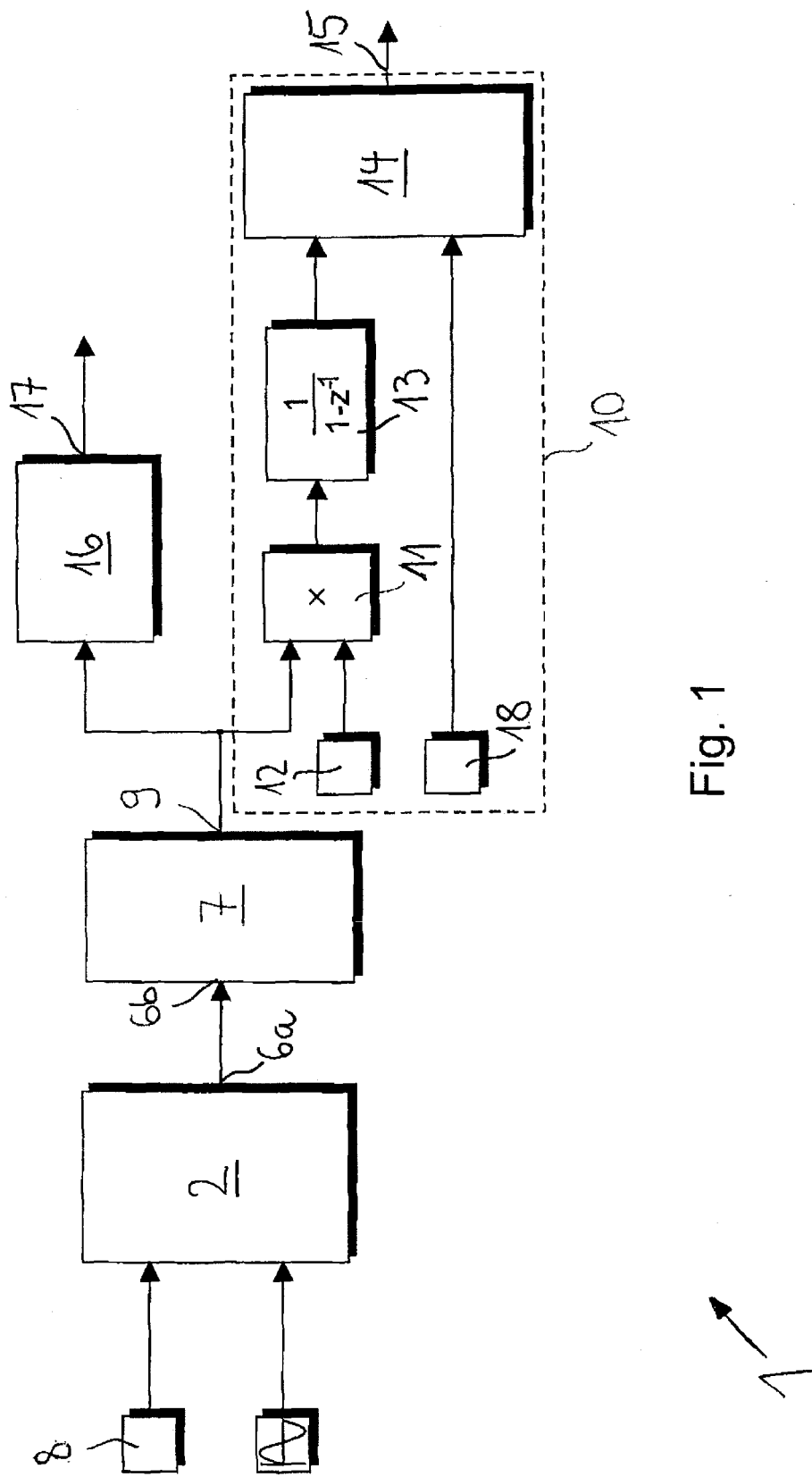
FIG. 1 shows a block diagram of an electrical circuit of a sensor module, which is integrated into a semiconductor chip of a sensor module.

A sensor module designated as a whole with 1 in FIG. 1 has a semiconductor chip, in whose substrate a sensor 2 is integrated monolithically to measure a magnetic flux density. As is evident in FIG. 2, sensor 2 has a Hall plate 3, which has a first terminal contact 4a, a second terminal contact 4b, a third terminal contact 4c, and a fourth terminal contact 4d.

Figure 2:
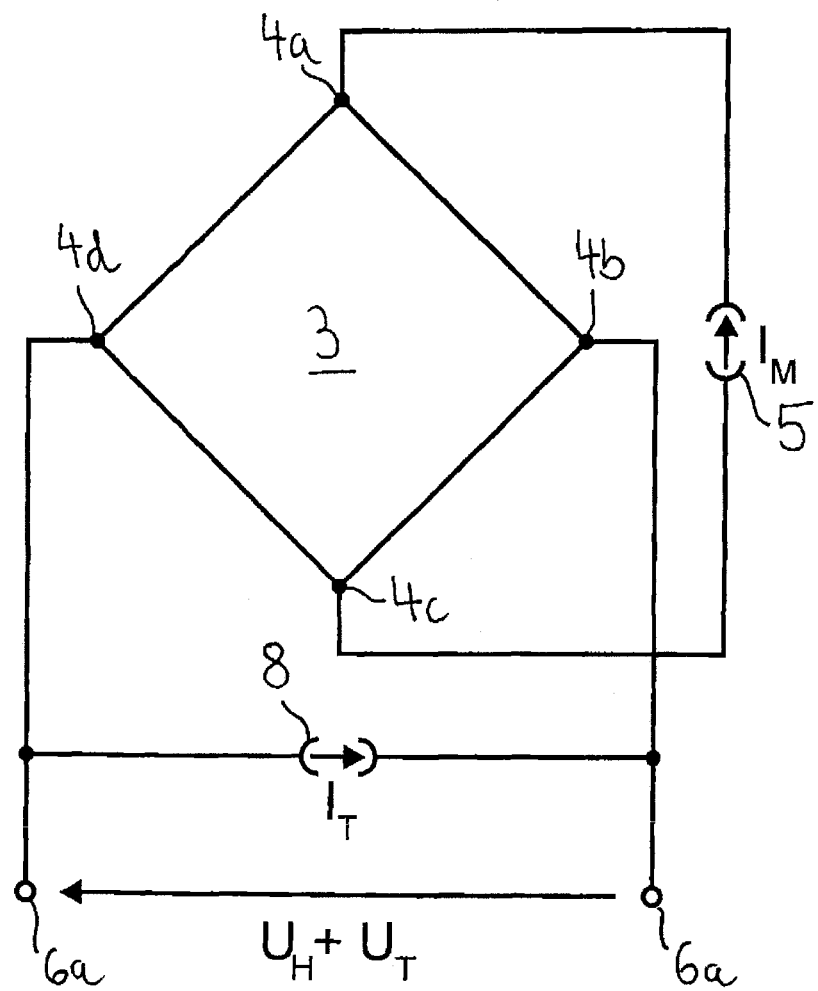
FIG. 2 shows a partial depiction of the electrical circuit, which has a Hall plate, to which a measuring current source and a test signal current source are connected.

The first and third terminal contacts 4a, 4c are spaced apart in a first direction running within the plane of Hall plate 3, and the second and fourth terminal contacts 4b, 4d in a second direction running perpendicular to the first direction within the plane of Hall plate 3. Terminal contacts 4a, 4b, 4c, 4d are connected in a manner known per se to a control unit which is integrated into the substrate and of which only a measuring current source 5 is shown in FIG. 2 for reasons of clarity. A constant electrical current $I_M$ is supplied to Hall plate 3 with the use of measuring current source 5. To this end, a first terminal of measuring current source 5 is connected to the first terminal contact 4a and a second terminal of measuring current source 5 to the third terminal contact 4c of measuring current source 5.

Hall plate 3 is penetrated normal to its plate plane by a magnetic flux to be measured, in which the electrical current $I_M$ flowing through Hall plate 3 is deflected. An electric field, which is measurable in the form of a Hall voltage $U_H$ between the second and fourth terminal contacts 4b, 4d, results in Hall plate 3 due to the deflection.

It is evident in FIG. 1 that a sensor output 6a carrying the Hall voltage is connected to an analog input 6b of an analog-to-digital converter 7. This is designed as a sigma-delta converter.

To check the functionality of sensor 2, sensor module 1 has a test signal generator 8, which provides an analog test signal, whose spectrum is substantially outside the spectrum of the measurement signal. Test signal generator 8 is formed as a current source, which has a first current source terminal and a second current source terminal. The test signal is a clean alternating current signal whose direct current component is equal to zero.

The first current source terminal is connected to the second terminal contact 4b and the second current source terminal to the fourth terminal contact 4d of Hall plate 3. The current generated by test signal generator 8 produces at the ohmic resistor of Hall plate 3 a voltage drop $U_T$, which overlaps additively the Hall voltage $U_H$. The corresponding sum signal $U_T+U_H$ can be tapped between the second and fourth terminal contact 4b, 4d of Hall plate 3. The sum signal is converted to a digital signal with the use of the analog-to-digital converter 7 and output at an output terminal 9 of analog-to-digital converter 7.

When the signal path leading from the one terminal of analog input 6b via the second terminal contact 4b, the Hall plate 3, and the fourth terminal contact 4d to the other terminal of analog input 6b is disturbed due to a defect, the test signal no longer reaches or reaches only in a changed form analog input 6b and output terminal 9. If a defect also occurs at analog-to-digital converter 7, the test signal is passed on no longer fault-free to output terminal 9. The test signal generator is therefore coupled to sensor 2 in such a way that it reaches output terminal 9 only in the case of a functional sensor 2.

To check the functionality of sensor 2, the digital output terminal 9 is connected to a diagnosis unit 10, which has a correlation unit 11 and a digital test signal generator 12. Test signal generator 12 at its output provides a digital test signal corresponding to the analog test signal and synchronous thereto.

A first correlation input of correlation unit 11 is connected to output terminal 9 of analog-to-digital converter 7 and a second correlation input is connected to the output of digital test signal generator 12. The output of correlation unit 11 is connected via an integrator 13 or a low-pass filter to a first input of a comparator 14. A second input of comparator 14 is connected to a reference value source 18, which provides a constant reference signal. At an output of comparator 14, the diagnosis signal is provided which indicates whether the test signal was detected at output terminal 9 and sensor 2 is thereby functional.

Correlation unit 11, test signal generator 12, integrator 13, and comparator 14 can be implanted as an operating program in a microcomputer, which is integrated monolithically in the semiconductor chip of sensor module 1. Correlation unit 11, test signal generator 12, integrator 13, and comparator 14 can also be arranged outside the semiconductor chip, however.

Figure 3:
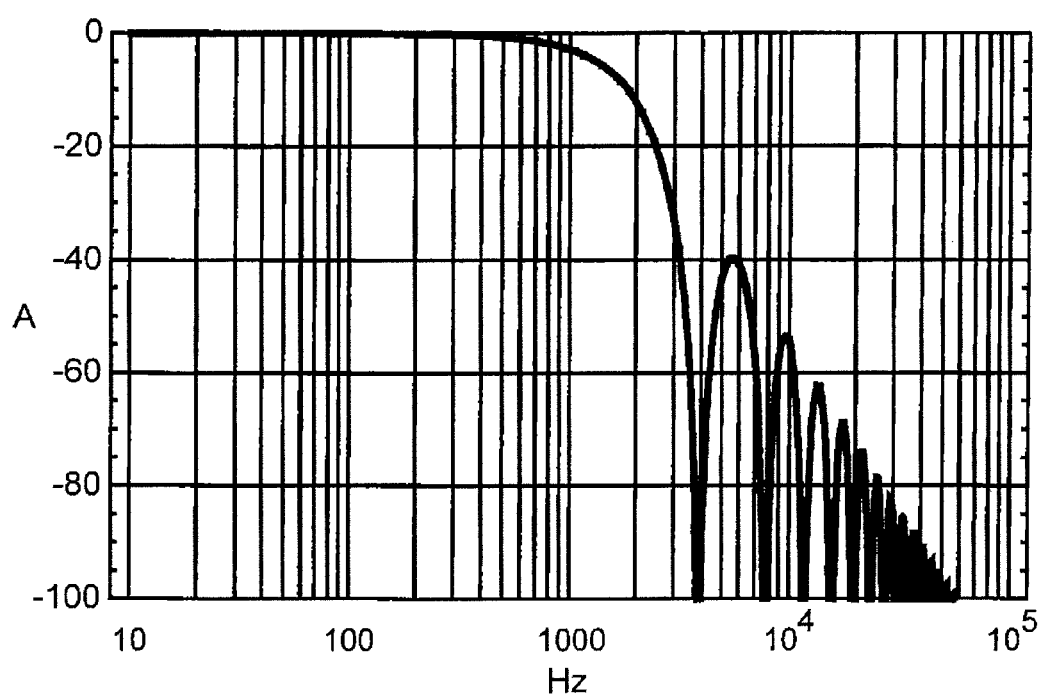
FIG. 3 shows a graphic depiction of the transfer function of a decimation filter, whereby the frequency is plotted in Hertz on the abscissa and the amplification in decibels on the ordinate.

It is evident in FIG. 1 that output terminal 9 is connected via a decimation filter 16 to a measurement signal output 17 of sensor module 1. FIG. 3 shows the transfer function of decimation filter 16. It is clearly evident that the transfer function has a substantially constant course until a cutoff frequency is reached, and that above the cutoff frequency several zero positions are present. The spectrum of the analog test signal has a number of pulse-shaped regions at which the spectrum has local maxima. The analog test signal is adjusted to the transfer function of decimation filter 16 in such a way that the local maxima of the test signal spectrum coincide with the zeros of the transfer function. The test signal is therefore suppressed in decimation filter 16, so that only the measurement signal corresponding to the Hall voltage $U_H$ is present in digital form at the measurement signal output. As a result, sensor 2 can be checked for functionality during ongoing operation.

Figure 4:
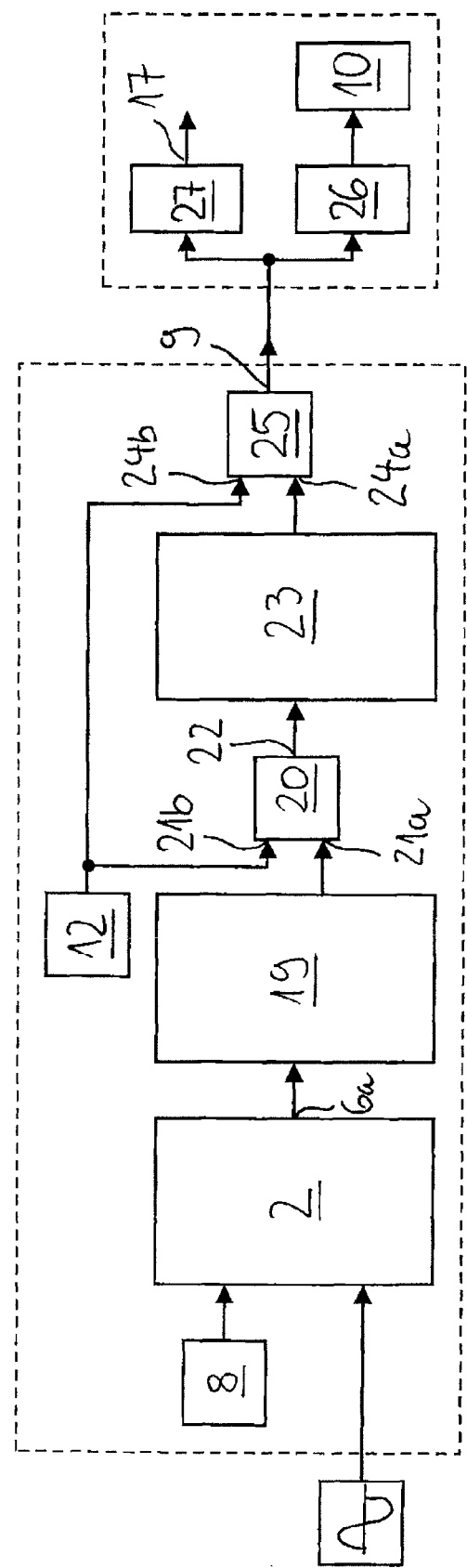
FIG. 4 shows a block diagram of a sensor module, which has a linear and a nonlinear signal processing stage.

In the exemplary embodiment shown in FIG. 4, sensor module 1 has a semiconductor chip into whose substrate a sensor 2 is integrated monolithically to measure a magnetic flux density. Sensor 2 corresponds to the sensor 2 depicted in FIGS. 1 and 2. Sensor 2 has an analog sensor output 6a, at which a sensor output signal is present, in which the analog test signal is superimposed additively on the analog measurement signal.

Sensor output 6a is connected to an analog input of an analog-to-digital converter, which is assigned to a linear signal processing stage 19, the analog input not being shown in greater detail in FIG. 4. Signal processing stage 19 can have, in addition to the analog-to-digital converter, component for calibration and/or linearization of the measurement signal.

A digital output of signal processing stage 19 is connected to a first input 21a of a subtraction element 20. A second input 21b of subtraction element 20 is connected to the output of a digital test signal generator 12, which at the second input 21b applies a digital test signal corresponding to the analog test signal and synchronous thereto. In the case of a functional sensor module 1, the linearly processed measurement signal is present at output 22 of subtraction element 20.

Output 22 of subtraction element 20 is connected via a nonlinear signal processing stage to a first input 24a of an addition element 25. The signal processing stage comprises an arithmetic logic unit for generating a nonlinearly processed measurement signal, which corresponds to the arc tangent of the linearly processed measurement signal.

A second input 24b of addition element 25 is connected to the output of digital test signal generator 12. The output of addition element 25 forms output terminal 9, at which a digital output signal is present which corresponds to the sum of the processed measurement signal and the test signal.

Output terminal 9 is connected via a high-pass filter 26 to a diagnosis unit 10, which has a component for generating a diagnosis signal, which indicates whether the test signal is present at output terminal 9. In addition, output terminal 9 is connected to measurement signal output 17 via a low-pass filter 27, which blocks the test signal and lets through the processed measurement signal.

High-pass filter 26, low-pass filter 27, and diagnosis unit 10 can be arranged outside the semiconductor chip.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for monitoring a function of a sensor module, the method comprising:
generating, via a sensor, a measurement signal for a physical quantity to be determined;
applying the measurement signal to an output terminal in an unchanged form or in a processed form after at least one linear signal processing step and/or at least one nonlinear signal processing step;
generating a test signal whose spectrum lies outside a spectrum of the measurement signal, the test signal being supplied at a place in the sensor from which it reaches the output terminal in unchanged form or in processed form after the performance of the at least one linear signal processing step and wherein the test signal is supplied to the sensor so that said signal reaches the output terminal only when said sensor is functional and when said sensor is functional said test signal is additively superimposed in an output signal applied on the unchanged or processed measurement signal,
comparing the output signal with the test signal;
generating a diagnosis signal that indicates whether the test signal is contained in the output signal; and
filtering the test signal out of the output signal and the remaining signal is applied as the measurement signal at a measurement signal output of the sensor module.

2. The method according to claim 1, wherein the measurement signal and the test signal are analog signals, which are converted by sigma-delta modulation into a digital output signal, which provides a digital test signal corresponding to the analog test signal and is correlated with the digital output signal, and the diagnosis signal is generated depending on the correlation result.

3. The method according to claim 2, wherein the test signal is removed by decimation filtering from the output signal, a transfer function of the decimation filtering has zero positions, and the spectrum of the analog test signal has local maxima, which coincide with the zeros.

4. The method according to claim 1, wherein the analog test signal is a square wave signal.

5. The method according to claim 1, wherein the test signal is supplied to the sensor at a place from which it reaches a sensor output only in the case of a functional sensor and is superimposed additively in a sensor signal applied on the measurement signal, the test signal is removed from the thus obtained sensor signal and the at least one nonlinear signal processing step is performed with the remaining signal, to provide the measurement signal in the processed form, the test signal is superimposed additively on the thus obtained, processed measurement signal and the superposition signal formed in this manner is applied at the output terminal.

6. The method according to claim 1, wherein the at least one nonlinear signal processing step comprises a trigonometric operation, particularly an arc tangent operation.

7. The method according to claim 1, wherein the sensor has a sensor region which is sensitive for the physical quantity and where as a measurement signal an electrical voltage dependent on the physical quantity is applied, and the test signal is an electric current, which is supplied to the sensor in such a way that it causes a voltage drop in the sensor region.

8. The method according to claim 1, wherein the physical quantity is a magnetic field.

9. A sensor module comprising:
a sensor with a sensor output configured to output a measurement signal for a physical quantity, the sensor output being connected to an output terminal directly or via at least one signal processing stage provided for processing the measurement signal;
a test signal generator configured to generate a test signal, whose spectrum is outside the spectrum of the measurement signal, the test signal generator being coupled to the sensor such that the test signal reaches the output terminal only in the case of a functional sensor and when said sensor is functional the test signal is superimposed additively on the measurement signal or the processed measurement signal; and
a diagnosis unit connectable to the output terminal, the diagnosis unit being configured to generate a diagnosis signal, which indicates whether the test signal is present at the output terminal,
wherein the output terminal is connectable via the test signal-blocking filter to a measurement signal output of the sensor module.

10. The sensor module according to claim 9, wherein the sensor output is configured to output an analog sensor output signal and the test signal generator is configured to generate an analog test signal, wherein the sensor output is connectable to the output terminal via an analog-to-digital converter or a sigma-delta converter, and wherein the diagnosis unit has a digital test signal generator for generating a digital test signal corresponding to the analog test signal and a correlation unit that is connected with a first correlation input to a converter output of the analog-to-digital converter and with a second correlation input to the digital test signal generator.

11. The sensor module according to claim 10, wherein the diagnosis unit has a comparator, which, to generate a diagnosis signal, is connectable with a first comparator input to an output of the correlation unit and with a second comparator input to a reference value source for a constant reference signal.

12. The sensor module according to claim 10, wherein the filter is configured as a decimation filter whose transfer function has zero positions, and the spectrum of the analog test signal has local maxima, which coincide with the zeros.

13. The sensor module according to claim 9, wherein the sensor output is connected directly or via a linear signal processing stage to a first input of a subtraction element, a second input of the subtraction element is connected to a terminal for the test signal, an output of the subtraction element is connected via a nonlinear signal processing stage to a first input of an addition element, a second input of the addition element is connected to the terminal for the test signal, and the output of the addition element forms the output terminal or is connected thereto via an additional signal processing stage.

14. The sensor module according to claim 9, wherein the nonlinear signal processing stage is configured to carry out a trigonometric operation, particularly to carry out an arc tangent operation.

15. The sensor module according to claim 9, wherein the test signal generator is a square wave signal generator.

16. The sensor module according to claim 9, wherein the test signal generator is designed as a current source, the sensor having a region sensitive for the physical quantity, the sensor region having an electrical resistance, and the sensor region being connectable to the test signal generator in an electric circuit.

17. The sensor module according to claim 9, wherein the sensor is a magnetic field sensor and has a Hall plate, which has at least one first terminal contact, a second terminal contact, a third terminal contact, and a fourth terminal contact, which are spaced apart from one another, the first terminal contact and the third terminal contact being connected to a measuring current source to supply a measuring current to the Hall plate, and the second terminal contact and the fourth terminal contact to tap off a Hall voltage, oriented transverse to the measuring current.

18. A method for monitoring a function of a sensor module, the method comprising:
generating, via a sensor, a measurement signal for a physical quantity to be determined;
applying the measurement signal to an output terminal in an unchanged form or in a processed form after at least one linear signal processing step and/or at least one nonlinear signal processing step;
generating a test signal whose spectrum lies outside a spectrum of the measurement signal, the test signal being supplied at a place in the sensor from which it reaches the output terminal in unchanged form or in processed form after the performance of the at least one linear signal processing step and wherein the test signal is supplied to the sensor so that said signal reaches the output terminal only when said sensor is functional and when said sensor is functional said test signal is additively superimposed in an output signal applied on the unchanged or processed measurement signal,
comparing the output signal with the test signal;
generating a diagnosis signal that indicates whether the test signal is contained in the output signal; and
filtering the test signal out of the output signal and the remaining signal is applied as the measurement signal at a measurement signal output of the sensor module,
wherein the measurement signal and the test signal are analog signals.

19. The method according to claim 18, wherein the test signal is a clean alternating signal having a direct current component equal to zero.

* * * * *